Figure 1:
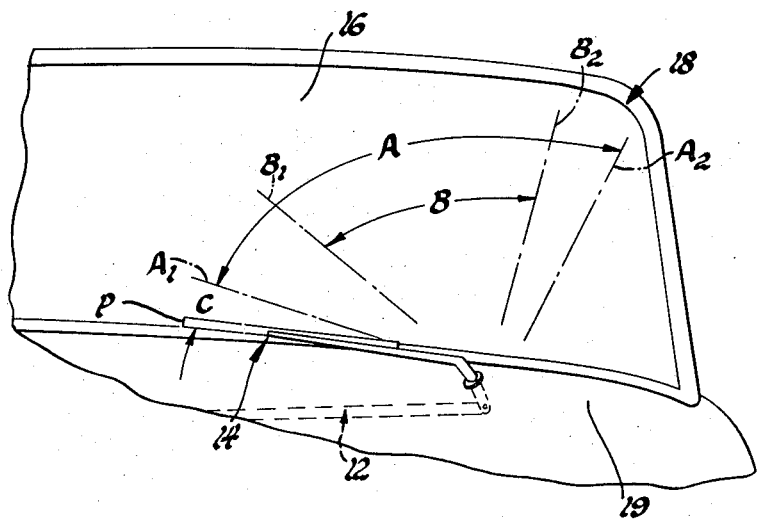

United States Patent
Elliott

[15] 3,689,817
[45] Sept. 5, 1972

[54] WINDSHIELD WIPER SYSTEM
[72] Inventor: James O. Elliott, Xenia, Ohio
[73] Assignee: General Motors Corporation, Detroit, Mich.
[22] Filed: Aug. 9, 1971
[21] Appl. No.: 170,112

[52] U.S. Cl.............318/443, 318/444, 318/DIG. 2
[51] Int. Cl.............................................H02p 1/04
[58] Field of Search.............318/443, 444, DIG. 2; 15/250.13

[56] References Cited

UNITED STATES PATENTS

| | | |
|---|---|---|
| 2,748,612 | 6/1956 | Dyer et al. ............15/230.13 X |
| 3,253,206 | 5/1966 | Romanowski ........318/DIG. 2 |
| 3,609,496 | 9/1971 | Peroy ........................318/444 |

Primary Examiner—Benjamin Dobeck
Attorney—W. E. Finken et al.

[57] ABSTRACT

In a preferred form, this disclosure relates to a windshield wiper system wherein the direction of the rotation of an electric motor is periodically reversed to effect oscillation of a wiper through a wipe cycle having a first angular stroke when a manual switch is placed in a first on position and is reversed periodically faster to effect oscillation of the wiper through a wipe cycle having a second angular stroke which is less than the first angular stroke when the manual switch is placed in a second on position. The windshield wiper system includes relay operated switch means which is operatively connected with the motor and the manual switch for reversing the direction of rotation of the motor and a plurality of position switches which are interconnected with the relay operated switch means and actuated by a cam on the drive shaft of the motor for controlling energization and de-energization of the relay operated switch means to effect the periodic reversal of the motor.

5 Claims, 2 Drawing Figures

INVENTOR.
James O. Elliott
BY
W.A. Schuetz
ATTORNEY

WINDSHIELD WIPER SYSTEM

The present invention relates to a windshield wiper system, and more particularly to a windshield wiper system which is selectively operable to oscillate a windshield wiper across a windshield of an automotive vehicle through wipe cycles having two different angular strokes.

Heretofore, electric windshield wiper systems have been provided which include control mechanisms to vary the angular wipe stroke or sweep of the windshield wiper between a wide and a narrow angular stroke. For example, see U.S. Pat. Nos. 2,173,447 and 2,800,675. These windshield wiper systems generally provide for a variation of the angular wipe stroke or sweep through various mechanical means, such as by lengthening or shortening the length of the throw of the system's drive linkage as desired by the operator.

Further, my co-pending U.S. Pat. application Ser. No. 78,439 discloses an electric windshield wiper system with a drive linkage which oscillates its windshield wipers through a wipe cycle having a first angular wipe stroke when a DC motor is driven in one direction and which oscillates its windshield wipers through a wipe cycle having a second angular wipe stroke less than the first angular stroke when the DC motor is periodically reversed. That electric windshield wiper system included a two-speed DC motor which is normally driven in one direction at either a high or low speed as controlled by a manual control switch and which rotates a drive shaft to drive the drive linkage. The drive linkage drives the windshield wipers through a first angular stroke in one direction for the first 180° of rotation of the drive shaft and then drives the wipers through a reverse stroke in the opposite direction for the next 180° of rotation of the drive shaft. The drive linkage thereby oscillated the system's windshield wipers through a wipe cycle having a first angular wipe stroke for each 360° of rotation of the drive shaft. The windshield wiper system of my co-pending application also includes a double pole, double throw relay which can be energized when the DC motor is being driven at either its high or low speed to reverse the direction of the current through the DC motor and thereby reverse the direction of rotation of the DC motor. The relay is energized in response to the closing of a segment wipe switch and thereafter is periodically de-energized and energized in response to the opening and closing of a pair of switches by a cam on the drive shaft of the DC motor. The switches are positioned relative to the drive shaft such that the direction of rotation of the motor and hence the drive shaft is caused to be reversed after a rotation of the drive shaft of less than 180°. It should be understood from this that it is the reversal of the motor and not the drive linkage which reverses the direction of the movement of the wipers when the segment wipe switch is closed. The windshield wipers are thereby oscillated through a wipe cycle having a second angular stroke by virtue of the periodic reversal of the DC motor alone.

An object of the present invention is to provide a new and improved electric windshield wiper system having a reversible electric motor means which is adapted to be connected with a power source and which has a drive shaft means for oscillating a windshield wiper, a manual switch means connected with the motor means and having first and second on positions for controlling energization of the motor means, a relay operated switch means operatively connected with the motor means and the manual switch means for reversing the direction of rotation of the motor means, a cam means rotatable with the drive shaft means, and a plurality of position switches interconnected with the relay operated switch means and the manual switch means for controlling energization and de-energization of the relay operated switch means to effect periodic reversal of the motor means, and in which the position switches are actuated by the rotatable cam means to effect continuous oscillation of the wiper through a wipe cycle having a first angular stroke when the manual switch is in its first on position and effect continuous oscillation of the wiper through a wipe cycle having a second angular stroke which is less than the first angular stroke when the manual switch is in its second on position.

Another object of the present invention is to provide a new and improved windshield wiper system as set forth in the preceding object and wherein the reversible electric motor means has only one speed.

These and other objects of the present invention are accomplished, in a preferred embodiment, by providing a windshield wiper system which is operatively connected with a DC power source and which has a reversible, single speed electric motor means for rotating a drive shaft means for driving a windshield wiper. The energization of the motor means is controlled by manual switch means which has first and second on positions. The windshield wiper system also includes a double pole, double throw relay which is connected with the motor means and which has a relay coil connected with the manual switch means for reversing the electrical path through the motor means when energized in order to reverse the direction of rotation of the motor means. The windshield wiper system further includes first and second position switch means which are connected between the relay coil and the manual switch means and which are actuated by a cam means driven by the drive shaft.

The first position switch means comprises first and second switches which are responsive to first predetermined angular movements of the cam means less than 360° when the manual switch means is in its first on position for alternately energizing and de-energizing the relay coil to periodically reverse the direction of rotation of the motor means and oscillate the wiper means at a first wipe frequency through a wipe cycle having a first angular stroke. The second position switch means comprises third and fourth switches which are responsive to second predetermined angular movements of the cam means less than the first angular movements when the manual switch is in its second on position for alternately energizing and de-energizing the relay coil to reverse the direction of rotation of the motor means periodically faster whereby the motor means oscillates the wiper means at a second wipe frequency greater than the first wipe frequency and through a wipe cycle having a second angular stroke less than the first angular stroke when the manual switch means is in its second on position.

Figure 2:
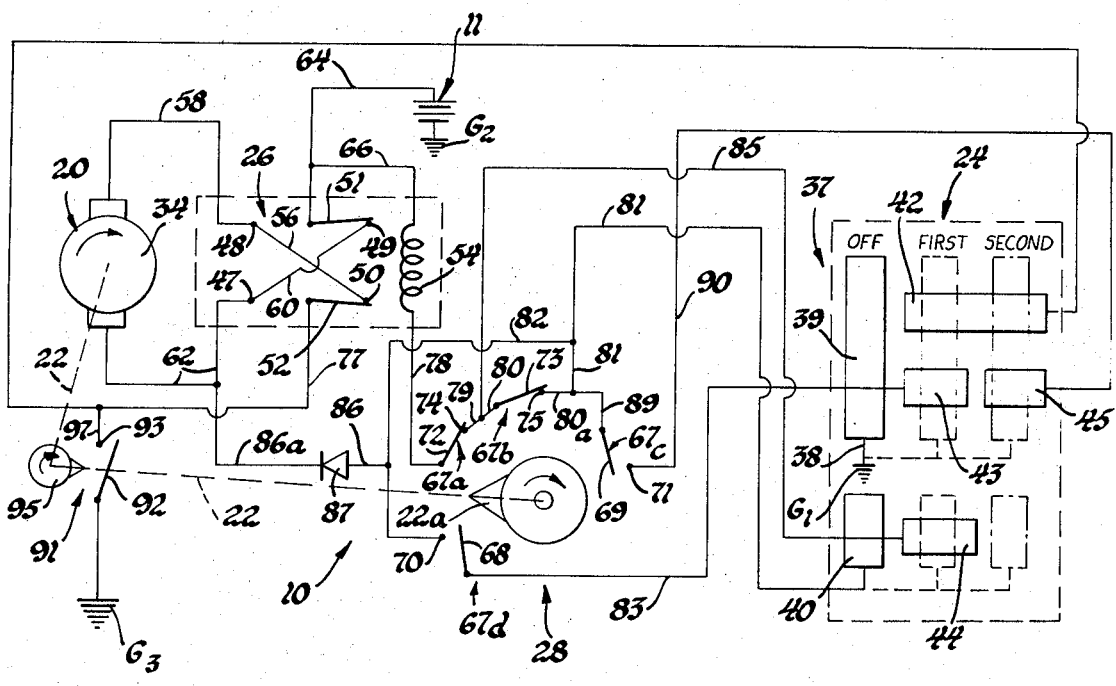

These and other objects of the present invention will become more fully apparent from the following description and drawing wherein:

FIG. 1 is a fragmentary front elevational view of an automotive vehicle embodying the windshield wiper system of the present invention and which graphically shows the first and second angular wipe strokes through which the windshield wiper can be oscillated; and FIG. 2 is a schematic control diagram of the windshield wiper system of the present invention.

As representing a preferred embodiment of the present invention, the drawing shows an electric windshield wiper system 10 having a suitable drive linkage means 12 which is adapted to oscillate a conventional windshield wiper arm and blade assembly 14 through a wipe cycle across the outer surface of the windshield 16 of an automotive vehicle 18. The wiper arm and blade assembly is rotatably supported in a conventional manner at its lower end by the body structure 19 of the vehicle 18. When the windshield wiper system 10 of the present invention has been actuated, the linkage means 12 oscillates the windshield wiper arm and blade assembly 14 in a conventional manner through a wipe cycle having either a first wipe stroke, herein shown as having an angle equal to the angle A, or a second wipe stroke, herein shown as having an angle equal to the angle B, which is less than the first angular stroke. It should be understood that a wipe cycle is meant to include the movement of windshield wiper arm and blade assembly 14 through both an outboard stroke and an inboard stroke. That is, movement from its inboard end of the stroke, $A_1^-$ or $B_1$, to the outboard end, $A_2$ or $B_2$, and back to the inboard end. Further, the windshield wiper system 10, when deactivated, is operative to move the windshield wiper arm and blade assembly 14 an additional angular movement, herein shown as having an angle equal to the angle C, from the inner end $A_1$ of the first angular stroke A to a depressed park position P immediately adjacent the bottom of the windshield 16.

It should also be understood that the windshield wiper system 10 includes a pair of windshield wiper arm and blade assemblies 14 which are located in conventional positions on both the passenger and driver sides of the vehicle 18, although only one is shown.

The windshield wiper system 10 broadly comprises a DC motor means 20 which drives a drive shaft 22 and a manual control switch 24 which controls energization of the DC motor 20. The system 10 also includes a relay operated switch means 26 which reverses the direction of the current through the DC motor to reverse the direction of rotation of the DC motor and position switch means 28 for alternately energizing and de-energizing the relay operated switch means 26 in response to predetermined angular movements of the drive shaft 22 to reverse the direction of rotation of the DC motor 20. Referring to Fig. 2, the motor means 20 is herein shown as a reversible single speed, permanent magnet DC motor having a wound armature 34 for driving the drive shaft 22 via a conventional gear reduction unit (not Shown). It should be noted that the motor means 20 could also be any suitable wound field motor. Fixed to the drive shaft 22 is a first cam 22a. The drive shaft 22 is suitably connected with the drive linkage means 12, shown in FIG. 1, to oscillate the windshield wiper arm and blade assembly 14.

The manual control switch means 24 could be of any suitable or conventional construction and is schematically shown as including a manually manipulatable control bar 37. The control bar 37 is movable between an off position, as shown by the solid lines in FIG. 2, a first on position, as shown by the dash lines in FIG. 2, and a second on position, as shown shown by the phantom lines in FIG. 2. The control bar 37 has a first contact portion 39 which is grounded via conductor 38 to ground $G_1$ and a second contact portion 40. The manual control switch means 24 also includes four stationary contact members 42–45. When the control bar 37 is moved from its off position to its first on position, the first contact portion 39 connects the stationary contact members 42 and 43 with ground $G_1$, and the second contact portion 40 engages the stationary contact member 44. When the control bar 37 is moved from its first on position to its second on position, the first contact portion connects the stationary contact members 42 and 45 with ground $G_1$, and the second contact portion 40 is disengaged from the stationary contact member 44.

The relay operated switch means 26 controls the electrical path or the direction of the current to the armature's winding (not shown). The relay operated switch means 26 comprises four fixed contacts 47–50, two movable contacts 51 and 52, and a relay coil 54. Fixed contact 48 is connected with the fixed contact 50 via conductor 56 and with one side of the armature's winding via conductor 58. The fixed contact 47 is connected with the fixed contact 49 via conductor 60 and with the other side of the armature's winding via conductor 62. The movable contact 51 is connected with the positive terminal of the battery 11 via a conductor 64, and the relay coil 54 is connected with the positive terminal of the battery 11 via conductors 64 and 66. The negative terminal of the battery 11 is connected to a ground $G_2$. When the relay coil 54 is de-energized, the two movable contacts 51 and 52 are spring biased into engagement with the fixed contacts 49 and 50, respectively, and thereby define an electrical path in one direction to the armature winding as will later be described. When the relay coil 54 is energized, the two movable contacts 51 and 52 are caused to move concurrently into engagement with the fixed contacts 48 and 47, respectively, and thereby reverse the direction of the electrical path 20 to the armature winding to reverse the direction of rotation of the armature 34, as will later be described.

The position switch means 28 comprises four switches 67a–67d which are positioned adjacent and in a spaced circular relationship about the outer periphery of the drive shaft 22. With the drive shaft 22 in the position shown in FIG. 2 wherein the windshield wiper arm and blade assembly 14 is in its depressed park position P, as shown in FIG. 1, the clockwise sequence of the switches 67a–67d from the cam 22a is the switch 67a, the switch 67b, the switch 67c, and the switch 67d. Switch 67a is approximately 15° clockwise from the position of the cam 22a corresponding to the depressed park position P of assembly 14, and switch 67d is located a first predetermined angle in a clockwise direction from switch 67a, which is approximately 330°. Switch 67c is approximately 165° clockwise from the position of the cam 22a corresponding to the depressed park position P of assembly 14, and switch 67b is located a second predetermined angle in a counterclockwise direction from switch 67c, which is approximately 90°. The switches 67d and 67 c comprise a pair of movable contacts or leaf springs 68 and 69, respectively, which are normally self-biased out of engagement with a pair of fixed contacts 70 and 71 to a normal open circuit position. The switches 67a and 67b comprise a pair of movable contacts or leaf springs 72 and 73, respectively, which are normally self-biased into engagement with a pair of fixed contacts 74 and 75 to a normal closed circuit position. The movable contacts 68–72 of the switches 67a–67 are positioned adjacent the outer periphery of the drive shaft 22 in a manner such that, upon rotation of the drive shaft 22, the cam 22a is caused to engage and move each of the movable contacts in sequence from its normal position to either an open or closed circuit position, as will later be described in more detail.

The windshield wiper system 10 is activated when the control bar 37 of the manual control switch means 24 is moved to its first on position in which it connects stationary contacts 42 and 43 with ground $G_1$. In this manner, the armature winding on the armature 34 is energized through a circuit traced from the positive terminal of the battery 11, conductor 64, movable contact 51, fixed contact 49, conductor 60, fixed contact 47, conductor 62, the armature winding, conductor 58, fixed contact 48, conductor 56, fixed contact 50, movable contact 52, a conductor 77, through fixed contacts 42, to the first contact portion 39 and to ground $G_1$ and through ground to the negative terminal of the battery 11. The energization of the armature winding causes the armature 34 and the drive shaft 22 attached thereto to rotate in a clockwise manner from the position shown in FIG. 2. As the cam 22a is rotated with the drive shaft 22 to a position immediately adjacent the movable contact 72, the drive shaft 22 pivots the windshield wiper arm and blade assembly 14 through the drive linkage 12 from its depressed park position P through angle C to its inboard stroke end $A_1$. As the drive shaft 22 and the cam 22a are rotated clockwise from immediately adjacent movable contact 72 to a position 180° from the position shown in FIG. 2, the windshield wiper arm and blade assembly 14 is pivoted by the linkage means 12 from the inboard stroke end $A_1$ through the angular stroke A to the outboard stroke end $A_2$. That position, which is approximately 180° from the position of the cam 22a shown in FIG. 2, is the throw-over or reversal point for the linkage means 12. Further clockwise rotation of the drive shaft 22 thereafter results in the linkage means 12 reversing the direction of movement of assembly 14. Therefore, the assembly 14 is driven from the outboard stroke end $A_2$ through the angular stroke A to the inboard stroke end $A_1$ as the cam 22a completes the first predetermined angular movement between the switches 67a and 67d, whereupon the cam 22a engages and moves the movable contact 68 to its closed circuit position. When this occurs, the relay coil 54 is energized through a circuit traced from the positive terminal of the battery 11, the conductor 64, the conductor 66, the relay coil 54, a conductor 78, the movable contact 72, the fixed contact 74, the conductors 79 and 80, the movable contact 73, the fixed contact 75, the conductors 80a–82, the fixed contact 70, the movable contact 68, the conductor 83, through the stationary contact 43, to the contact portion 39 and to ground $G_1$, and through ground to the negative terminal of the battery 11. The energization of the relay coil 54 causes the movable contacts 51 and 52 of the relay operated switch means 26 to be moved concurrently into engagement with the fixed contacts 48 and 47, respectively. Accordingly, this results in the direction of the electrical path through the DC motor 32 being reversed as will be seen by tracing the circuit from the positive terminal of the battery 11, the conductor 64, the movable contact 49, fixed contact 48, the conductor 58, the armature winding of the armature 34, the conductor 62, the fixed contact 47, the movable contact 52, the conductor 77, through the stationary contact 42, to the contact portion 39 and to ground $G_1$, and from ground to the negative terminal of the battery 11.

It should be appreciated that the reversal of the electrical path through the armature 34 of the DC motor 20 causes the armature 34 and the drive shaft 22 to reverse their direction of rotation from clockwise to counterclockwise.

It should be noted that, as the drive shaft 22 rotates the cam 22a through the first predetermined angle A, the cam closes the switch 67c and opens the switch 67b, as will later be described. This has, however, no effect upon the system 10 because the switch 67b is shorted through a circuit traced through conductors 80 and 81, stationary contact 44, and conductors 85 and 80 and the switch 67c is not grounded through fixed terminal 45.

With the reversal in the direction of rotation of the armature 34 and the drive shaft 22 from clockwise to counterclockwise, the cam 22a is caused to disengage the movable contact 68. The movable contact 68 returns to its normal open circuit position as the cam 22a is disengaged therewith. However, the relay coil 54 remains energized and the direction of rotation of the armature 34 and the drive shaft 22 continues in a counterclockwise direction. The relay coil 54 remains energized through a circuit traced from the positive terminal of the battery 11, the conductors 64 and 66, the relay coil 54, the conductor 78, the movable contact 72, the fixed contact 74, the conductor 79, the conductor 85, the fixed contact 44, the second contact portion 40, the conductors 81 and 82, a conductor 86, a diode 87, the conductor 86a, the conductor 62, the fixed contact 47, the movable contact 52, the conductor 77, through the stationary contacts 42, to the contact portion 39 and to ground $G_1$, and through ground to the negative terminal of the battery 11. As the drive shaft 22 rotates in a counterclockwise direction through the first predetermined angle A, it should be appreciated that the windshield wiper arm and blade assembly 14 is pivoted by the linkage means 12 through a complete wipe cycle having an angular stroke similar to that previously described. The relay coil 54 is maintained energized until the cam 22a completes a movement through the first predetermined angle in a counterclockwise direction from the movable contact 68 whereupon the cam 22a engages the movable contact 72 and moves it to an open circuit position to de-energize the relay coil 54. The de-energization of the relay coil causes the movable contacts 51 and 52 of the relay operated switch means 26 to be moved concurrently into engagement with the fixed contacts 49 and 50, respectively. In a manner similar to that previously described, the direction of rotation of the armature 34 and the drive shaft 22 is reversed again from counterclockwise to clockwise, and the windshield wiper arm and blade assembly 14 is driven through yet another wipe cycle.

From the foregoing, it should be understood that when the manual control switch 24 is in its first on position the direction of rotation of the armature 34 and the drive shaft 22 is periodically reversed and the windshield wiper arm and blade assembly 14 is oscillated by the linkage means 12 at a first wipe frequency and through a wipe cycle having a first angular stroke A.

When the control bar 37 is moved to the second on position and upon rotation of the cam 22a through the second predetermined angle from the switch 67b to the switch 67c, the cam engages and moves the movable contact 69 to its closed circuit position, and the relay coil 54 is energized through a circuit traced from the positive terminal of the battery 11, the conductors 64 and 66, the relay coil 54, the conductor 78, the movable contact 72, the fixed contact 74, the conductors 79 and 80, the movable contact 73, the fixed contact 75, the conductor 80a, a conductor 89, the movable contact 69, the fixed contact 71, a conductor 90, through the fixed contact 45, to the contact portion 39 and to ground $G_1$, and through ground to the negative terminal of the battery 11. The direction of rotation of the armature 34 and the drive shaft 22 is thereby reversed to counterclockwise. Further, when the cam 22a is in a position immediately adjacent the switch 67c, the windshield wiper arm and blade assembly 14 is at the outboard stroke end $B_2$ of the angular stroke B. When the direction of rotation of the drive shaft 22 reverses to counterclockwise, the cam 30 is caused to disengage the movable contact 69 which is then spring biased to its normal open circuit position. The relay coil 54, however, remains energized through a circuit traced from the positive terminal of the battery 11, the conductors 64 and 66, the relay coil 54, the conductor 78, the movable contact 79, the fixed contact 74, the conductors 79 and 80, the movable contact 73, the fixed contact 75, the conductors 80a, 81, 82, 86, the diode 87, the conductor 86a, the conductor 62, the fixed contact 47, the movable contact 52, the conductor 77, through the stationary contact 42, to the contact portion 39 and to ground $G_1$, and through ground to the negative terminal of the battery 11. During the counterclockwise movement of the drive shaft 22 through the second predetermined angle between the switches 67b–c, the drive linkage 12 drives the assembly 14 from the outboard stroke end $B_2$ through the angular stroke B to the inboard stroke end $B_1$. After the second predetermined angular movement of the cam 22a in a counterclockwise direction from the movable contact 69 to the movable contact 73, the cam 22a is caused to engage and move the movable contact 73 to its open circuit position and thereby de-energize the relay coil 54. As previously described, the de-energization of the relay coil 54 results in reversal in the direction of rotation of the armature 34 and the drive shaft 22 to clockwise. During the following clockwise movement of the drive shaft 22 through the second predetermined angle between the switches 67b–c, the drive linkage 12 drives the assembly 14 from the inboard stroke end $B_1$ through the angular stroke B to the outboard stroke end $B_2$.

Unlike the situation where the control bar 37 is in its first position and movement of the drive shaft 22 through the first predetermined angle results in the linkage means 12 driving the assembly 14 through a full wipe cycle, movement of the drive shaft 22 through the second predetermined angle results in the linkage means 12 driving the assembly 14 through only one angular stroke B. The assembly 14 is oscillated through a wipe cycle having an angular stroke B by reversal of the motor 20 not by the linkage means 12 because the position of switches 67b–c never allows the drive shaft 22 to pass the throw-over or reversal point for the linkage means. Further, because the second predetermined angle is less than one-half the first predetermined angle, the angular stroke B is less than the angular stroke A and, because the assembly 14 travels a shorter distance through a wipe cycle having an angular stroke B than one with an angular stroke A, the wipe frequency is greater when the contact bar 37 is in its second position than when it is in its first position.

The windshield wiper system 10 also includes depressed park switch means comprising a fixed contact 93 and a movable contact 92 which is connected to ground $G_3$. In operation, the depressed park switch means 91 serves as a holding circuit. The movable contact 92 is normally spring biased into engagement with the fixed contact 93 to a normal closed circuit position. The movable contact 92 is responsive to a second cam 95 fixed on the drive shaft 22 and is moved to an open circuit position when the cam 95 reaches the position shown in Fig. 2.

When the contact bar 37 is moved from either its first on or second on positions to its off position, the stationary contacts 42 and 43 or 45 are no longer grounded to ground $G_1$ and, ordinarily, the DC motor 20 would be de-energized regardless of the position of the windshield wiper arm and blade assembly 14. The DC motor 20 is, however, maintained in an energized state when the contact bar 37 is moved to its off position through a circuit traced from the positive terminal of the battery 11, the conductor 64, the relay operated switch means 26, the conductor 77, a conductor 97, the fixed contact 93, the movable contact 92 to ground $G_3$, and through ground to the negative terminal battery 11. Further, when the contact bar 37 is moved to its off position, the relay coil, if not already, is de-energized, thereby providing for the armature 34 and the drive shaft 22 to be rotated in a clockwise direction. As the cam 22a engages and moves the movable contacts 68 and 69 to their closed circuit positions, no effect is had on the DC motor 20 because the stationary contacts 43 and 44 are not grounded through the contact bar 37. Therefore, the drive shaft 22 continues to rotate in a clockwise direction beyond the movable contact 68 to the position shown in FIG. 2. This additional clockwise movement of the drive shaft 22 moves the windshield wiper arm and blade assembly 14, which has reached the inner end $A_1$ of the first angular stroke A when the cam 22a moves movable contact 68 to its closed circuit position, through the angle C, as shown in FIG. 1, and to its depressed park position P immediately adjacent the bottom of the windshield 16. When the windshield wiper arm and blade assembly 14 reaches its depressed park position, the cam 95 engages and moves the movable contact 92 to its open circuit position which serves to de-energize the DC motor 20.

The foregoing disclosure relates only one embodiment of the invention which may be modified withing the scope of the appended claims.

What is claimed is:

1. A windshield wiper system comprising: a reversible electric motor means adapted to be connected with a power source and driving a drive shaft means for oscillating a windshield wiper; manual switch means connected with said motor means and having first and second on positions for controlling energization of said motor means; relay operated switch means operatively connected with said motor means and said manual switch means for reversing the direction of rotation of said motor means; cam means rotatable with said drive shaft means; a plurality of position switches interconnected with said relay operated switch means and said manual switch means for controlling energization and de-energization of said relay operated switch means to effect periodic reversal of said motor means, said position switches being actuated by said rotatable cam means and effecting continuous oscillation of the wiper through a wipe cycle having a first angular stroke when the manual switch is in its first on position and effecting continuous oscillation of the wiper through a wipe cycle having a second angular stroke which is less than said first stroke when the manual switch is in its second on position.

2. A windshield wiper system comprising: a reversible, single speed electric motor means operatively connected with a DC power source and driving a drive shaft means for oscillating a windshield wiper means; manual switch means connected with said motor means and having first and second on positions for controlling energization of said motor means; a relay having a relay coil and associated switch means, said switch means being connected with said motor means and said manual switch means for reversing the electrical path from the power source through said motor means to reverse the direction of rotation of said motor means; cam means rotatable with said drive shaft means; position switch means connected between said relay coil and said manual switch means for alternately energizing and de-energizing said relay in response to first predetermined angular movements of said cam means to periodically reverse the direction of rotation of said motor means to oscillate the wiper means at a first wipe frequency and through a wipe cycle having a first angular stroke when said manual switch means is in its first on position and for alternately energizing and de-energizing said relay in response to second predetermined angular movement of said cam means less than said first predetermined angular movements to reverse the direction of rotation of said motor means periodically faster when said manual switch means is in the second on position whereby said motor means oscillates the wiper means at a second wipe frequency greater than said first wipe frequency and through a wipe cycle having a second angular stroke less than said first angular stroke when the manual switch means is in its second on position.

3. A windshield wiper system comprising: a reversible, single speed electric motor means driving a drive shaft means for oscillating windshield wiper means and operatively connected with a DC power source; manual switch means connected with said motor means and having first and second on positions for controlling energization of said motor means by a power source; a relay having a relay coil and associated switch means, said associated switch means connected with said motor means and said manual switch means for reversing the electrical path from the power source through said motor means to reverse the direction of rotation of said motor means; cam means rotatable with said drive shaft; first position switch means interconnected between said relay coil and said manual switch means and responsive to first predetermined angular movements less than one full rotation of said cam means for alternately energizing and de-energizing said relay to periodically reverse the direction of rotation of said motor means to oscillate the wiper means at a first wipe frequency and through a wipe cycle having a first angular stroke when said manual switch means is in its first on position; and second position switch means connected between said relay coil and said manual switch means and responsive to second predetermined angular movements of said cam means less than said first angular movements for alternately energizing and de-energizing said relay to reverse the direction of rotation of said motor means periodically faster when said manual switch means is in its second on position whereby said motor means oscillates the wiper means at a second wipe frequency greater than said first wipe frequency and through a wipe cycle having a second angular stroke less than said first angular stroke when said manual switch means is in its second on position.

4. A windshield wiper system comprising: a reversible, single speed electric motor means driving a drive shaft means for driving windshield wiper means and operatively connected with a DC power source; manual switch means connected with said motor means and having first and second on positions for controlling energization of said motor means by a power source; a double pole, double throw relay connected with said motor means and having a relay coil connected with said manual switch means for reversing the electrical path from the power source through said motor means when said relay coil is energized to reverse the direction of rotation of said motor means; cam means rotatable with said drive shaft; first position switch means connected between said relay coil and said manual switch means and comprising first and second switches responsive to first predetermined angular movements less than one full rotation of said cam means for alternately energizing and de-energizing said relay coil to periodically reverse the direction of rotation of said motor means to oscillate the wiper means at a first wipe frequency and through a first wipe cycle having a first angular stroke when said manual switch means is in its first on position; and second position switch means also connected between said relay coil and said manual switch means and comprising third and fourth switches responsive to second predetermined angular movements of said cam means less than one half said first predetermined angular movements for alternately energizing and de-energizing said relay coil to reverse the direction of rotation of said motor means periodically faster when said manual switch means is in its second on position whereby said motor means oscillates the wiper means at a second wiper frequency greater than said first wipe frequency and through a wipe cycle having a second angular stroke less than said first angular stroke when said manual switch means is in its second on position.

5. A windshield wiper system for an automotive vehicle comprising: a direct voltage source; windshield wiper means; a reversible single speed DC motor driving a drive shaft for driving linkage means; linkage means for normally oscillating said windshield wiper means through a full wiper cycle for each full rotation of said drive shaft; a manual control switch having first and second on positions; means for connecting said direct voltage source, said motor, and said manual control switch to provide for actuation of said windshield wiper means by said motor when said manual control switch is moved to said first and second on positions; a double pole, double throw relay having its contacts connected between said direct voltage source and said motor and having a relay coil for reversing the electrical path through said motor when energized and de-energized to reverse the direction of rotation of said drive shaft means of said motor to oscillate said windshield wiper means; means for connecting said relay coil with said manual control switch; cam means rotatable with said drive shaft means; a first switch biased to a normal open circuit position and a second switch biased to a normal closed circuit position and which are interconnected between said relay coil and said manual control switch, said first switch being engaged and moved to a closed circuit position upon a first predetermined angular movement less than one full rotation of said cam means in one direction to energize said relay coil to reverse the direction of rotation of said motor when said manual switch means is in said first on position and upon disengagement with said cam means being operative to move to said open circuit position, said second switch serving to maintain said relay coil energized after said first switch moves to said open circuit position and being engaged by said cam means upon another first predetermined angular movement of the cam means in the opposite direction to be moved to an open circuit position to de-energize said relay coil and reverse the direction of rotation of said motor when said manual control switch is in its first on position whereby said motor drives said linkage means which oscillates the wiper means at a first wipe frequency and through a wipe cycle having a first angular stroke for each first predetermined angular movement of said drive shaft; a third switch spring biased to a normal open circuit position and a fourth switch biased to a normal closed position and which are interconnected between said relay coil and said manual control switch, said third switch being engaged and moved to a closed circuit position by said cam means upon a second predetermined angular movement in one direction of said cam means less than one-half said first angular movement to energize said relay coil to reverse the direction of rotation of said motor when said manual switch means is in said second on position and said third switch being operative to move to said normal open circuit position upon disengagement by said cam means, said fourth switch serving to maintain said relay coil energized after said third switch moves to said normal open circuit position and being engaged and moved to an open circuit position by said cam means upon another second predetermined angular movement in the opposite direction to de-energize said relay coil to reverse the direction of rotation of said motor when said manual control switch is in its second on position whereby said motor is reversed periodically faster and drives said linkage means which oscillates the wiper means at a second wipe frequency greater than said first wipe frequency and through a wipe cycle having a second angular stroke less than said first angular stroke for every two second predetermined angular movements of said drive shaft when said manual switch means is in its second on position.

* * * * *